Feb. 28, 1961  C. J. RODMAN  2,973,170
WING STRUCTURE
Filed June 27, 1957  2 Sheets-Sheet 2
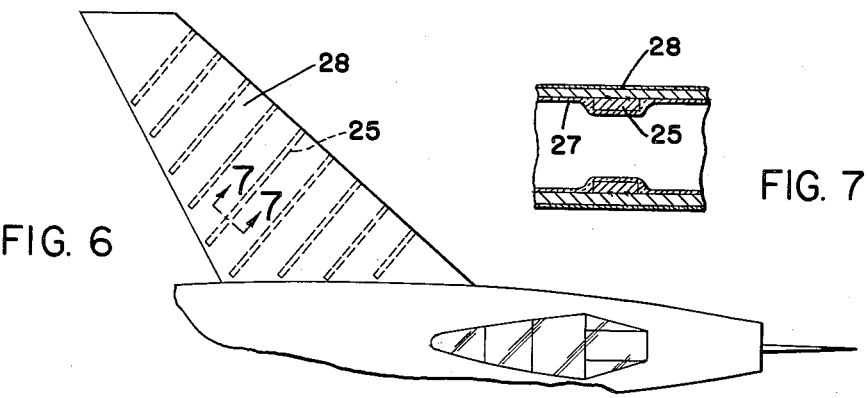
FIG. 6
FIG. 7
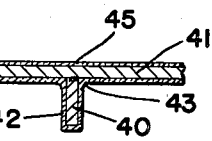
FIG. 9
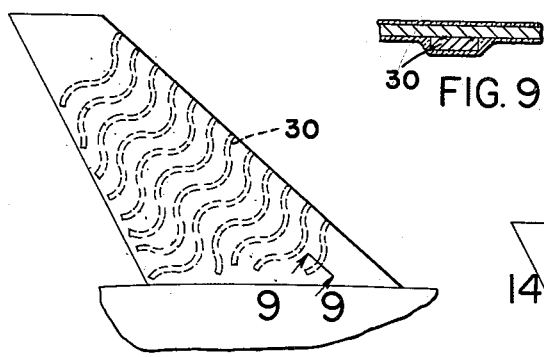
FIG. 8
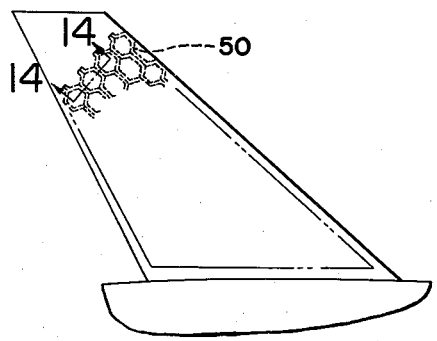
FIG. 12
FIG. 13
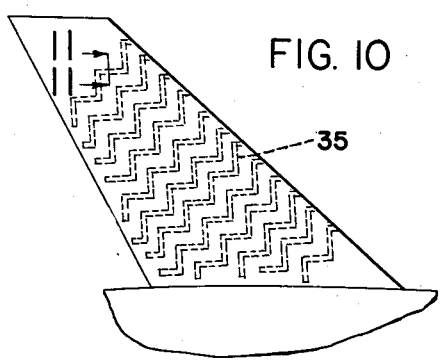
FIG. 10
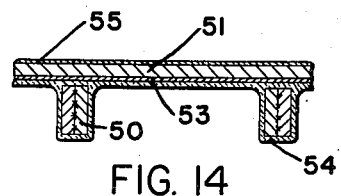
FIG. 14
FIG. 11
INVENTOR.
CLARENCE J. RODMAN United States Patent Office 2,973,170
Patented Feb. 28, 1961

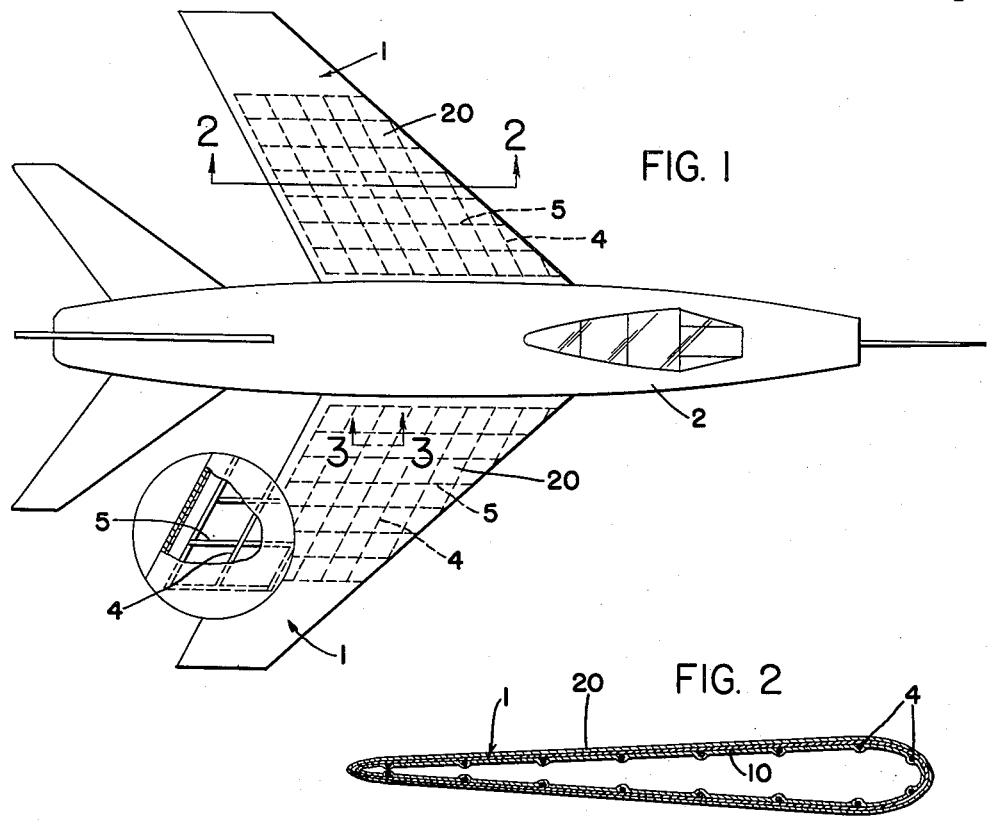

2,973,170
WING STRUCTURE
Clarence J. Rodman, 1315 S. Union Ave., Alliance, Ohio
Filed June 27, 1957, Ser. No. 668,407
5 Claims. (Cl. 244—123)

This invention relates to an improved wing structure designed especially for a jet plane operating at tremendously high speeds. The invention provides light-weight reinforcement on the inner surface of the wing, and a smooth porcelainized outer wing surface which presents little resistance to the flow of air over it, and which also withstands high temperatures.

According to this invention a light-weight reinforced wing structure of exceptional strength is provided by affixing open metal reinforcement to the inner surface of the wing and porcelainizing this reinforced surface with a continuous coating of porcelainized enamel. In the preferred embodiment of the invention, the outer surface of the wing is also coated with porcelain (vitreous) enamel, preferably titania (titanium oxide) enamel. The coating on the outer surface is perfectly smooth and minimizes the air resistance and provides a surface which will withstand the high temperatures developed by the air resistance when the plane is flown at excessively high speeds. The porcelain coating on the interior of the wing gives added strength with minimum added weight.

The invention will be further described in connection with the accompanying drawings, in which—

Fig. 1 is a plan view of a jet plane with an insert on an enlarged scale, and the sheet metal of the enlargement broken away to show the reinforcement;

Fig. 2 is a section through the wing on the line 2—2 of Fig. 1;

Figs. 3, 4 and 5 show different types of open metal reinforcement with a porcelain coating;

Fig. 6 is a plan view illustrating the use of parallel, straight reinforcing strips;

Fig. 7 is a section through the wing on the line 7—7 of Fig. 6, showing sections through the reinforcements;

Fig. 8 illustrates the use of serpentine reinforcements;

Fig. 9 is a section through a reinforcing element on the line 9—9 of Fig. 8;

Fig. 10 illustrates the use of zigzag reinforcements;

Fig. 11 is a section on the line 11—11 of Fig. 10;

Fig. 12 is a section through a wing with a vertical reinforcement;

Fig. 13 is a view of a wing showing a different type of reinforcement; and

Fig. 14 is a section on the line 14—14 of Fig. 13.

The wings 1 of the plane illustrated in Fig. 1 are attached to the fuselage 2 in any suitable manner. The reinforcement comprises a network of crossed wires or rods 4 and 5 of relatively small diameter, and where the rods cross one another the crossed rods are flattened against the wing so that the reinforcement is in contact with the wing substantially up to the intersection of the wires or rods. The rods are preferably of aluminum or magnesium, or other light-weight metal, but other material of sufficient compressive strength can be utilized. As illustrated in Fig. 2, the rods 4 and 5 of Fig. 1 are circular in cross section.

The wing is porcelainized on both surfaces. It is first covered on both surfaces with a cobalt ground coat (not shown). Figures 3, 4 and 5 show cross sections through reinforcements of different shapes, the reinforcements 4 of Fig. 3 being the cylindrical reinforcements described in Figs. 1 and 2.

Alternative structures are indicated in Figs. 4 and 5. The reinforcements 7 of Fig. 4 are triangular in cross section, and the reinforcements 8 of Fig. 5 are rectangular in cross section.

Open reinforcement of the type illustrated in Fig. 1, regardless of the shape of the rods or wires from which it is formed, extends over the inner surface of the leading edge of the wing, and extends backwardly any desired distance to give the required reinforcement. A coating of porcelain enamel is shown on both surfaces of the wing structure. The showing of the cobalt ground coat would merely complicate the drawings, and is omitted.

The coatings 10, 11 and 12 on the inner surfaces of the wing structures illustrated in Figs. 3, 4 and 5 are continuous over the entire portion of the plane covered by the reinforcement. Both the exposed surface of the reinforcement and the exposed surface of the wing are covered with the same continuous coating. Figures 3, 4 and 5 clearly show fillets 14, 15 and 16 at the edges of the reinforcements where they contact the sheet metal to which they are attached. These fillets are important as they are thicker than the balance of the coating and afford substantial added resistance to the flexing of the wing. The porcelain coating protects the inner surface of the wing against oxidation and other deteriorative influences, and insures against separation of the reinforcement from the sheet metal.

The outer surface of the sheet metal in all of these views is covered with a porcelain coating 20. This coating minimizes air resistance and withstands high temperatures.

The porcelainized coatings on the inner and outer surfaces of the wing are baked simultaneously or successively. They may be baked at the same or different temperatures. After baking they will resist the high temperatures developed at the high speeds at which planes now travel, and the very smooth surfaces produced by the enamel minimize the friction at the wing surface, and consequently the temperature developed.

The possibility of compressing the wing is dependent primarily upon reinforcement perpendicular to the leading edge. Figures 6–11 illustrate such reinforcements. In Fig. 6 the reinforcements are flat strips of metal 25 which may, for example, be an inch or more in width. Wider or narrower strips may be used. The edges may be sheer or beveled. The strips will be spaced between three and 10 inches apart depending upon the thickness of each reinforcement, its width, the gauge of the metal to which it is attached, the nature of the wing structure and the maximum speed of the plane. Ordinarily these reinforcements will be of aluminum, magnesium or other light-weight non-ferrous metal, but steel, etc. reinforcements may be used. If of the same composition as the wing, the reinforcement is most easily bonded to the wing. They are preferably welded together but may be bonded in any suitable manner. Figure 7 shows the reinforcements 25 affixed to the inner surface of both the top and bottom of the wing with a porcelain coating 27 inside of the wing and a porcelain coating 28 on its outer surface.

Parallel straight-line reinforcements such as illustrated in Fig. 6 do not spread the effect of the reinforcement as much as a serpentine reinforcement 30, such as shown in Figs. 8 and 9, or a zigzag reinforcement 35 such as shown in Figs. 10 and 11. Thus discrete reinforcements may be undulatory, or relatively straight.

They need not extend backwardly from the leading edge of the wing as far as the wing is to be reinforced, because the reinforcement of the leading edge may be supplemented by separate reinforcing elements, all lying in the general direction of the reinforcements 25 of Fig. 6 but with the areas reinforced by each of the reinforcing elements, overlapping. Undulatory reinforcements such as shown in Figs. 8–11 may cover overlapping areas of the wing surface or they may be separated by unreinforced areas.

Figure 12 illustrates how a relatively thin reinforcement 40 can be placed on edge, so that it lies in a plane perpendicular to the surface of the wing 41. The entire exposed areas of the reinforcement and the inner surface of the wing are coated with a continuous coating of vitreous enamel 42. The fillets 43 which form in the corners of the reinforcements and the wing are thicker than the balance of the enamel coating and provide substantial reinforcement. The outer surface of the wing is covered with the vitreous enamel coating 45.

The honeycomb or grid reinforcement 50 of Fig. 13 is formed by welding together the contacting areas of the angularly bent strips which form the reinforcement. This type of reinforcement may be welded to the inner surface of the wing 51, but is preferably embedded in the coating of vitreous enamel. This is done by first covering the inner surface of the wing with a cobalt oxide or other ground coat 53 and baking it. This is covered with vitreous enamel by dipping or spraying, etc.; the reinforcement 50 is placed on this; the exposed surfaces of the reinforcement are sprayed or otherwise coated with enamel, and then the enamel on the inner surface of the wing is all baked at one time to form the coating 54. The outer surface of the wing is covered with the vitreous enamel coating 55. The inner and outer coatings may be baked simultaneously.

The cross-sectional shape and the outline of the reinforcements is not too important. Open metal reinforcement gives maximum added strength with minimum added weight. The reinforcement, although open, may be continuous over any desired area, as in Fig. 1, or may be composed from discrete and spaced elements; and the entire reinforced area is covered by a porcelain coating which gives substantial added reinforcement to the wing, with minimum weight increase.

The invention does not relate to the general structure of the wing, which may have any suitable cross section and be braced with ribs, as desired. It relates to any wing made from a sheet of steel, iron, alloys of iron, copper-clad iron, aluminum-clad steel, aluminum, magnesium, etc. which is reinforced on its interior with open metal reinforcement and preferably coated with a continuous coating of vitreous enamel. The metal reinforcement is not continuous, but open. It may be welded or otherwise united to the wing.

Several types of reinforcements are disclosed, each of which is preferably covered with a vitreous enamel coating which forms one continuous coating over all exposed surfaces of the reinforcement and the area of the wing which is reinforced. Fillets of enamel formed along the edges of the reinforcing element or elements add appreciable strength to the structure. The reinforcement may be a reticulated wire or rod structure spot welded, or preferably continuously welded to the wing structure so that the reinforcement and wing are welded to one another throughout their areas of contact, including the areas adjacent the intersections of the wires or rods. These wires or rods have high tensile strength, relatively low elongation, and may be up to 3/16 inch (or somewhat more) in diameter. The spacing of the wires will be dependent upon their strength, and they may, for example, be 6 inches apart, or more generally 4 to 8 inches apart, or the space between them may be no more than an inch or two.

Alternatively, the wing may be reinforced by discrete elements preferably arranged substantially perpendicular to the leading edge of the wing. Such reinforcements may be spaced strips, usually parallel, which are straight or serpentine or zigzag strips, etc., preferably with the areas to which they are attached overlapping. Thin reinforcements of this type which lie flat against the wing structure are referred to herein as laminate reinforcements.

Instead of reinforcements which lie flat against the wing surface, the strips may be placed on edge. Such strips are preferably straight, but may be zigzag, wavy, etc. Such reinforcements may be of the order of 1/16 to 1/8 inch thick and may extend as much as 1/4 or 3/8 inch away from the wing surface. Such strips may form a honeycomb structure.

Although preferably welded to the wing, the reinforcement may be embedded in the enamel coating. It is customary to cover a metal surface with a cobalt-oxide or other ground coat before applying a vitreous enamel. If the reinforcement is to be embedded in the enamel without welding, the ground coat is applied to the wing and baked, as the first step. This coat is then covered with the enamel, the reinforcement is placed on this enamel coat before baking, the exposed surface of the reinforcement is then coated with enamel, and then the enamel is baked. This method is particularly suited to fastening to the wing those types of reinforcements that do not lie flat against the wing.

When two metal plates of the same thickness are placed one on top of the other without being fastened together, and these are then placed on two spaced supports and a weight is applied between the supports, the two plates bend only approximately half as much as either one alone. However, if the two plates are firmly secured to each other so that one cannot slip over the other, the amount the two are bent by the application of a weight varies inversely as the cube of the thicknses of the two plates, and the deflection at the midpoint is only one-eighth that of a single sheet. The laminate reinforcements of this invention embody this principle.

The reinforcement may be spot welded to the wing. It is preferable to weld the entire surface of the reinforcement to the wing. To do this, the wing may rest on, or be fitted against, one electrode of the welding equipment, and then by placing the reinforcement on the wing, and pressing the two together by the pressure of the other electrode, the weld formed will be continuous throughout the length of the reinforcement.

The drawings and details given herein are illustrative. Modifications may be made without avoiding the invention which is defined in the claims which follow.

What I claim is:

1. An airplane wing having open metal reinforcement over at least a portion of the inner surface thereof, said reinforcement being coated by a thin, continuous coating of porcelain enamel which covers the exposed surface of the reinforcement and the exposed surface of the wing and bonds the reinforcement to said wing inner surface.

2. An airplane with a wing at least a portion of the inner surface of which is reinforced by open metal reinforcement firmly bonded thereto, with a continuous coating of porcelain enamel covering the outer surface of the wing, and a continuous coating of porcelain enamel covering the inner surface of the wing over the exposed surfaces of the reinforcement and the exposed surfaces of the surface structure of the wing to which the reinforcement is attached, said inner coating bonding said reinforcement to said wing inner surface.

3. An airplane with a wing having a continuous coating of porcelain enamel over the inner surface thereof, and a reinforcing element embedded in and completely covered by the enamel.

4. An airplane with a wing having a continuous coating of porcelain enamel over the inner surface thereof, and a grid reinforcement embedded in and completely covered by the enamel.

5. An airplane wing having at least a portion of its inner surface reinforced by an open metal reinforcement, a continuous coating of porcelain enamel bonded to and covering the outer surface of said wing, and a continuous coating of porcelain enamel covering the inner surface of the wing and the exposed surfaces of the reinforcement and bonding said reinforcement to said wing inner surface, said inner coating forming strengthening fillets between the edges of said reinforcement and said wing inner surface.

References Cited in the file of this patent

UNITED STATES PATENTS

| | | |
|---|---|---|
| 2,371,754 | Gillum | Mar. 20, 1945 |
| 2,383,342 | Riley | Aug. 21, 1945 |
| 2,531,541 | Spicer | Nov. 28, 1950 |
| 2,540,331 | Hlavaty | Feb. 6, 1951 |
| 2,757,105 | Terry | July 31, 1956 |
| 2,817,484 | Stenzel | Dec. 24, 1957 |